UNITED STATES PATENT OFFICE.

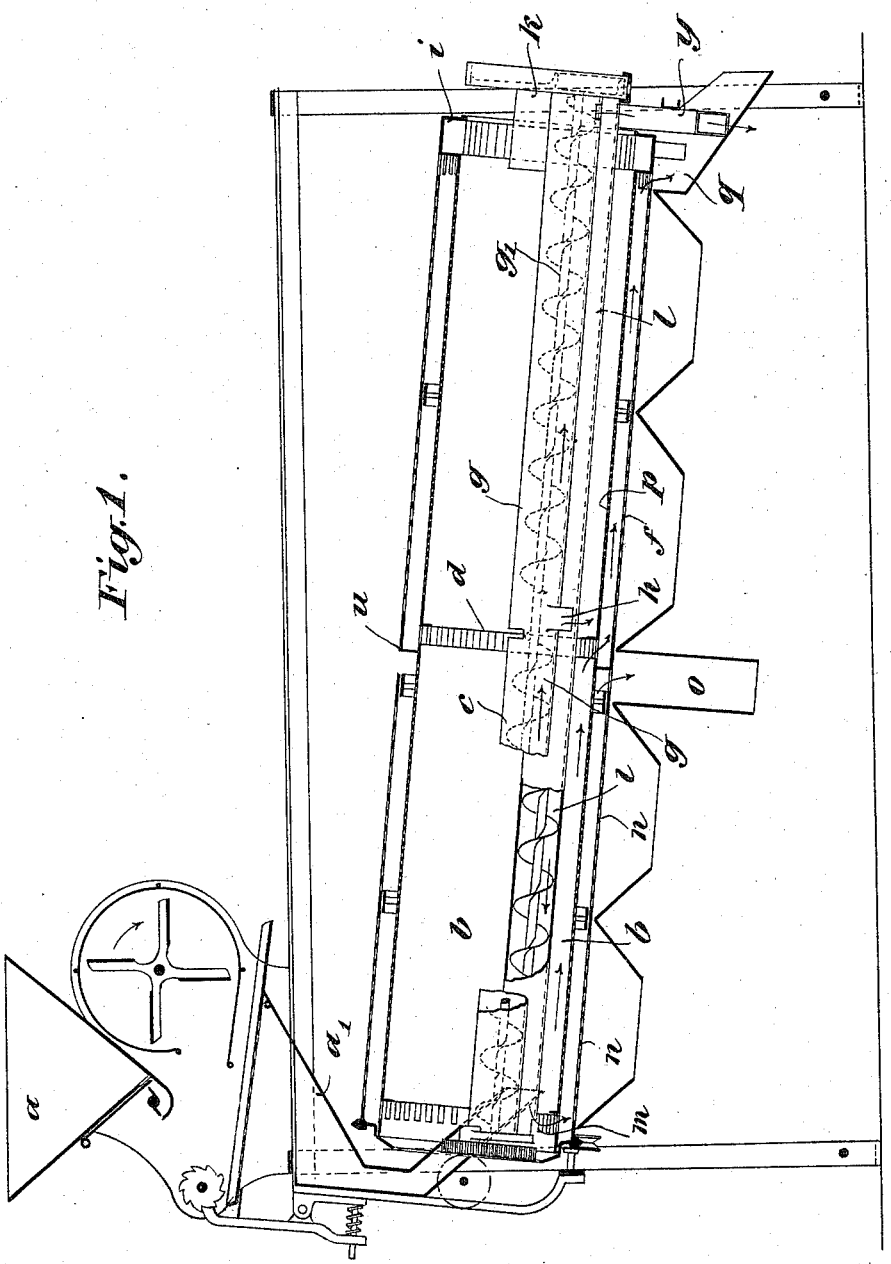

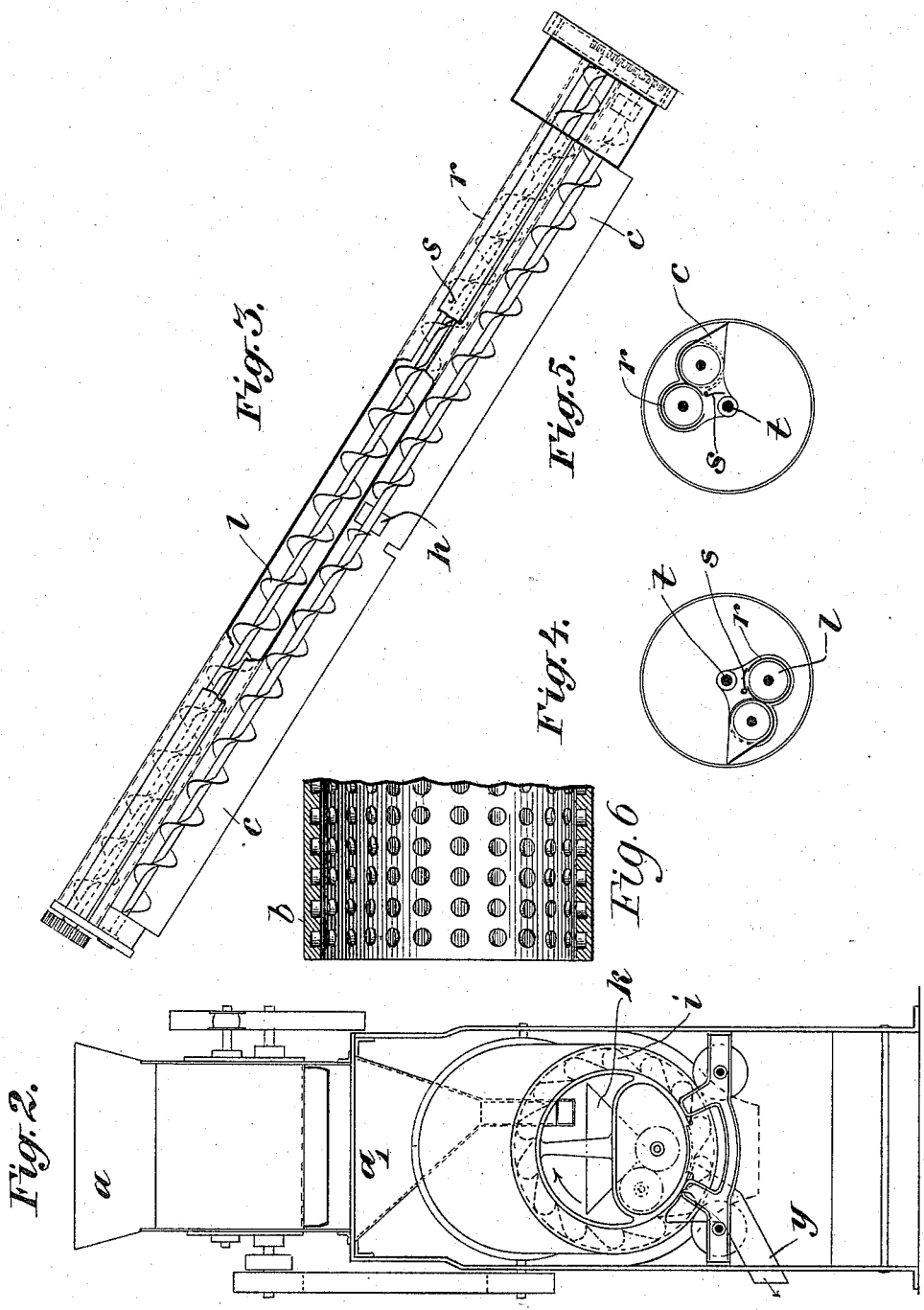

WILHELM KRÜGER, OF KALK, NEAR COLOGNE, GERMANY.

GRAIN-SIFTING MACHINE.

SPECIFICATION forming part of Letters Patent No. 580,496, dated April 13, 1897.

Application filed December 16, 1895. Serial No. 572,311. (No model.)

*To all whom it may concern:*

Be it known that I, WILHELM KRÜGER, a subject of the King of Prussia, Emperor of Germany, and a resident of Kalk, near Cologne, in the Kingdom of Prussia, German Empire, have invented a certain new and useful Improved Grain-Sifting Machine, of which the following is a full, clear, and exact description.

The present invention relates to bolting machinery; and it consists of a rotary bolting-drum by means of which grain may be sorted into several classes, as hereinafter more particularly described; and in order to render the present specification more easily intelligible reference is had to the accompanying drawings, in which similar letters of reference denote similar parts throughout the several views.

Figure 1 is a vertical longitudinal section through an apparatus constructed according to the present invention. Fig. 2 is an end elevation. Fig. 3 is a plan of the trough and transporter or elevator device arranged in the drum. Fig. 4 is a transverse section through the drum with the trough and elevator in their normal position. Fig. 5 is a similar section showing the trough and elevator reversed in order to empty any grain therein before commencing to sort another kind of grain; and Fig. 6 is a partial detail longitudinal section taken at the center of the drum, showing the alveolar indentations therein.

According to the present invention the grain is fed into the hopper $a$, arranged at the upper end of the cylinder $b$. The grain falls onto a bolter, where it is shaken, and then through the passage $a'$ into the drum $b$. For a distance of about half its length the drum $b$ is provided with somewhat coarse alveolar indentations, at the end of which is a series of larger outlets $d$, annularly arranged around the drum. The coarser indentations in the upper part of the drum will raise the smaller grains and mutilated grains, as also other seeds, as the drum rotates, the same falling into the trough $c$, which extends throughout the length of the drum, and is provided with a flared opening, Fig. 4, along its whole length. Thus the heavier grain only remains in the drum $b$, passes down the same, and out at the annular discharge-opening $d$ into a second drum $f$, surrounding the drum $b$, said drum being divided into two compartments $n$ and $f$ by means of a partition $u$. Within the trough $c$ is a transporting-spiral $g$, which feeds the small and mutilated grains, as also seeds of weeds and the like separated out of the grain in the upper part of the drum $b$, toward the opening $h$, through which they fall into the lower part $p$ of the drum, which is provided with finer alveolar indentations. Here they are lifted by the rotating drum into the second part of the trough, (designated by $g$.) Any seeds or small or mutilated grains remaining in the lower part $p$ of the drum will pass down the same into the ring of scoops $i$, arranged at the lower end of the drum and more clearly visible in Fig. 2. These scoops $i$ raise the grains and seeds and throw them into the hopper $k$, which feeds them to a transport-spiral $l$, inclosed in a casing $r$, provided with a cover $s$, extending along the whole of its length, Figs. 3 and 4. By means of this spiral the grains and seeds are carried back to the beginning of the drum $b$ and pass through the ring of outlets $m$ into the upper part $n$ of the exterior drum $n\ f$. The smaller grain falls through the slots of this part $n$ of the exterior drum, while the larger grain passes down the same and out at the openings $o$, having outlet-funnel, which are annularly arranged round the drum and separate the parts $n$ and $f$ of the said drum.

The larger class of grain remaining in the upper part of the drum $b$ passes down the same and out at the openings $d$ into the exterior drum at the lower part $f$ of the same and thence out at the chute $q$.

The mutilated grains and other seeds, which are lifted by the lower part $p$ of the drum $b$ into the lower part $g$ of the trough $c$ $g$, are carried by a spiral $g'$ in this part of the trough down the same and pass out of the apparatus at the opening $y$.

The trough $c\ g$ and the chute $r$, having the spiral $l$, are pivotally mounted at their ends on a pivot $t$, Figs. 4 and 5, and the latter is provided with a longitudinal cover $s$, hinged thereto. If one sort of grain has been bolted and it is desired to work a different kind, the said trough and chute are turned upside down on their pivot $t$, so that any grains which may have remained therein will be emptied out, when they are replaced in their normal position. On turning the chute $r$ upside down, Fig. 5, the cover $s$ of the same will fall open, so that no obstruction will be offered to the escaping grain.

I claim as my invention—

1. The combination of a rotary interior drum having a series of alveolar indentations of larger size extending about half its length and a series of smaller similar indentations extending over about the other half thereof and having at about the middle thereof and between the two series of indentations a ring of larger outlets $d$ and an exterior drum $n\ f$ surrounding said interior drum and having a partition $u$ at about the center thereof, an open trough $c\ g$ extending throughout the said interior drum and having an outlet $h$ therein below the ring of openings $d$, transport-spirals $g\ g'$ in said trough and an opening or outlet $y$ at the lower end thereof, a ring of scoops $i$ at the lower end of the interior drum, a hopper $k$ within said scoop-ring said hopper being adapted to receive the grain raised by the scoop-ring, a chute $r$ arranged along said interior drum and a spiral $l$ therein, an outlet at the upper end of said chute, a ring of outlets $o$ at the center of the exterior drum, an outlet-funnel in connection with said ring, a ring of outlets and outlet-chute $q$ at the lower end of the said exterior drum and a ring of outlets $m$ at the upper end of the interior drum and means for rotating said drum substantially as described and shown.

2. The combination of a rotary interior drum, having alveolar indentations as specified having at about the middle thereof a ring of larger outlets $d$, a ring of outlets $m$ at the upper end thereof and a ring of scoops $i$ at the lower end, and an exterior drum $n\ f$ also perforated, and having partition $u$ and ring of larger outlets with outlet-funnel at about the middle, and ring of outlets with outlet-funnel $q$ at the lower end, an open trough having transport-spirals and a closed chute $r$, said trough and chute being revolubly mounted on suitable end pivots $t$ and a hinged cover $s$ to the closed chute and means for rotating the said drum in the manner and for the purpose substantially as described and shown.

In testimony whereof I have signed this specification in the presence of two subscribing witnesses.

WILHELM KRÜGER.

Witnesses:
 SOPHIE NAGEL,
 WILLIAM H. MADDEN.